United States Patent [19]

Widdig et al.

[11] 3,852,463
[45] Dec. 3, 1974

[54] COMBATING FUNGI WITH AMIDOPHENYLISOTHIOUREAS

[75] Inventors: Arno Widdig, Blecher; Engelbert Kuhle, Bergisch-Gladbach; Hans Scheinpflug, Leverkusen; Ferdinand Grewe, Burscheid; Helmut Kaspers; Paul-Ernst Frohberger, both of Leverkusen, all of Germany

[73] Assignee: Bayer Aktiengesellschaft, Leverkusen, Germany

[22] Filed: May 15, 1973

[21] Appl. No.: 360,484

Related U.S. Application Data

[63] Continuation-in-part of Ser. No. 141,978, May 10, 1971.

[30]  Foreign Application Priority Data

May 25, 1970  Germany............................ 2025412

[52] U.S. Cl.................. 424/300, 424/263, 424/264, 424/266, 424/274, 424/275, 424/278, 424/285, 424/DIG. 8
[51] Int. Cl........................... A01n 9/12, A01n 9/20
[58] Field of Search ......... 424/300, DIG 8; 260/470

[56]  References Cited
UNITED STATES PATENTS
3,711,504   1/1973   Adams et al........................ 260/470
FOREIGN PATENTS OR APPLICATIONS
4,519,078   3/1970   Japan................................. 260/470

*Primary Examiner*—Albert T. Meyers
*Assistant Examiner*—Allen J. Robinson
*Attorney, Agent, or Firm*—Burgess, Dinklage & Sprung

[57]  ABSTRACT

Amidophenylisothioureas of the formula

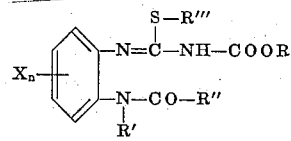

in which
  $n$ is 0, 1 or 2,
  each X is halogen, lower alkyl or lower alkoxy,
  R is lower alkyl,
  R' is hydrogen or lower alkyl,
  R'' is hydrogen; alkyl optionally substituted by at least one of halogen, nitrile, lower alkoxy, lower alkylmercapto, lower alkoxycarbonyl, phenoxy, halogenophenoxy; alkylphenoxy, alkoxyphenoxy and arylmercapto; cycloalkyl; aralkyl optionally substituted by halogen, lower alkyl or lower alkoxy; aryl optionally substituted by halogen, lower alkyl or lower alkoxy; or a five- or six-membered heterocyclic radical containing at least one oxygen, sulfur or nitrogen heteroatom, and
  R''' is alkyl; cycloalkyl; alkenyl; or aralkyl optionally substituted in the aryl moiety by at least one of lower alkyl, lower alkoxy and halogen,
which possess fungicidal properties.

9 Claims, No Drawings

COMBATING FUNGI WITH AMIDOPHENYLISOTHIOUREAS

This application is a continuation-in-part of application Ser. No. 141,978 filed May 10, 1971, now pending.

The present invention relates to and has for its objects the provision of particular new amidophenylisothioureas, i.e., N-(2-amidophenyl)-N'-alkoxycarbonyl-S-substituted-isothioureas, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It is known from U.S. Pat. No. 2,457,674 that certain dithiocarbamates, for example zinc-ethylene-1,2-bis-dithiocarbamate (A), can be used as fungicides. This particular active compound however does not always show a satisfactory activity when used at low concentrations.

The present invention provides, as new compounds, the amidophenylisothioureas of the general formula

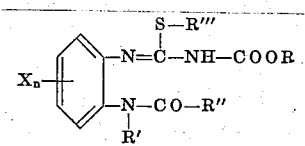

in which
n is 0, 1 or 2,
each X is halogen, lower alkyl or lower alkoxy,
R is lower alkyl,
R' is hydrogen or lower alkyl,
R'' is hydrogen; alkyl optionally substituted by at least one of halogen, nitrile, lower alkoxy, lower alkylmercapto, lower alkoxycarbonyl, phenoxy, halogenophenoxy, alkylphenoxy, alkoxyphenoxy and arylmercapto; cycloalkyl; aralkyl optionally substituted by halogen, lower alkyl or lower alkoxy; aryl optionally substituted by halogen, lower alkyl or lower alkoxy, or a five- or six-membered heterocyclic radical containing at least one oxygen, sulfur or nitrogen heteroatom, and R''' is alkyl; cycloalkyl; alkenyl; or alralkyl optionally substituted in the aryl moiety by at least one of lower alkyl, lower alkoxy and halogen.

The compounds of the formula (I) have been found to exhibit strong fungicidal properties.

The present invention also provides a process for the preparation of an amidophenylisothiourea of the formula (I) in which an amidophenylthiourea of the general formula

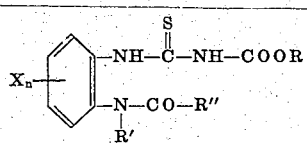

in which
X, n, R, R' and R'' have the above-mentioned meanings, is reacted with an alkylating agent of the formula $$R''' - Y \quad (III)$$

in which
R''' has the above-mentioned meaning and
Y is halogen, arylsulfonate or alkylsufate, in the presence of a base and of a diluent.

Surprisingly, the isothioureas according to the invention display a higher fungicidal activity than the above-mentioned, commercially available product zinc ethylene-1,2-bis-dithiocarbamate. The substances according to the invention therefore represent a significant enrichment of the art.

If N-(2-acetamidophenyl)-N'-ethoxycarbonylthiourea, alkylsulfate, iodide and sodium hydroxide are used as the starting materials, the course of the reaction can be represented by the following equation:

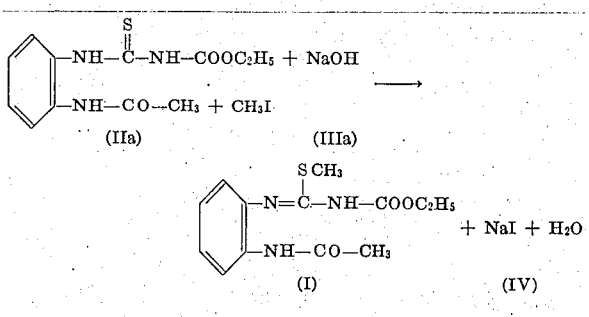

Advantageously, in the various definitions of X, R, R', R'' and R''' the lower alkyl radicals contain up to 4 carbon atoms and the cycloalkyl radicals contain from 5 to 8 carbon atoms. The alkyl radical of R'' desirably contains up to 18 carbon atoms and the alkyl or alkenyl radical of R''' up to 12 carbon atoms. Preferably, X is chlorine, bromine, fluorine, methyl, ethyl, isopropyl, n-butyl, methoxy, ethoxy or isopropoxy; n is 0 or 1; R is methyl, ethyl or isopropyl; R' is hydrogen, methyl or ethyl; R'' is methyl, ethyl, propyl, undecyl, heptadecyl, phenyl, p-chlorophenyl, p-methylphenyl, p-methoxyphenyl, 2-furyl, 2-thienyl, 2-pyridyl, 3-pyridyl, 4-pyridyl, 4-thiazolyl or phenoxymethyl; and R''' is methyl, ethyl, isopropyl, n-butyl, cyclohexyl, benzyl or allyl.

The amidophenylthioureas to be used as starting materials are generally defined by the formula (II).

The following may be mentioned as examples of the amidophenylthioureas: N-2-acetamindophenyl-N'-methoxycarbonylthiourea, N-(2-acetamido-4-methylphenyl)-N'-ethoxycarbonylthioured, N-2-butyramidophenyl-N'-ethoxycarbonylthiourea, N-2-benzamidophenyl-N'-ethoxycarbonylthiourea, N-(2-phenoxyacetamidophenyl)-N'-methoxycarbonylthiourea, N-(2-furoamidophenyl)-N'-methoxycarbonylthiourea, N-(2-thiophenecarboxamidophenyl)-N'-ethoxycarbonylthiourea, N-2-picolinylaminophenyl-N'-methoxycarbonylthiourea, N-2-nicotinamidophenyl-N'-ethoxycarbonylthiourea, and N-2-isonicotindmidophenyl-N'-ethoxycarbonylthiourea.

The amidophenylthioureas used as starting materials are obtainable by reacting 2-aminoaniline derivatives with isothiocyanates in the presence of inert organic solvents at temperatures preferably between about 0° and 40°C (German Patent Application P 19 60 027.2).

The alkylating agents to be used as starting materials are defined by the formula (III).

As examples of the alkylating agents there may be mentioned: methyl iodide, ethyl iodide, isopropyl iodide, cyclohexyl bromide, dimethyl sulfate, toluenesulfonic acid methyl ester, allyl bromide and benzyl chloride, which compounds are generally known.

Possible diluents for carrying out the process according to the invention are water or organic solvents, especially polar organic solvents, for example, alcohol, acetone, dimethylsufoxide, dimethylformamide or acetonitrile, either by themselves or in admixture with water.

The bases to be used as auxiliary substances in the process according to the invention can include most of the customary bases. Preferably, however, alkali metal hydroxides, carbonates or bicarbonates, such as potassium hydroxide, sodium hydroxide, sodium carbonate or sodium bicarbonate, are used.

The reaction temperatures can be varied within a broad range. In general, however, the process is carried out at about −10° to +40°C, preferably at about 0° to +30°C.

In carrying out the process according to the invention, 1 mole of alkylating agent and 1 mole of base are usually employed per mole of amidophenylthiourea although excess alkylating agent and base can be used without disadvantage. Working-up of the product can be effected by introducing the reaction mixture into water, filtering off and drying the product which has precipitated, and purifying it by recrystallization.

The active compounds according to the invention display a strong fungitoxic action. They do not damage crop plants in the concentrations required for combating fungi and have a low toxicity to warm-blooded animals. For these reasons they are suitable for use as plant protection agents for combating fungi. Fungitoxic agents in plant protection are employed to combat *Archimycetes, Phycomycetes, Ascomycetes, Basidiomycetes* and *Fungi Imperfecti*.

The active compounds according to the invention have a very broad spectrum of action and can be employed against parasitary fungi which attack aboveground parts of the plants or attack the plants through the soil, and also against seed-borne causative organisms of diseases.

They are particularly active against those fungi which cause powdery mildew diseases. This group of fungi predominantly includes representatives from the family of the *Erysiphaceae*, the most important genera being *Erysiphe, Uncinula (Oidium), Sphaerotheca* and *Podosphaera*. The following may be mentioned as important fungi: *Erysiphe cichoracearum, Podosphaera leucotricha, Uncinula nector* and *Sphaerotheca fuliginea*.

The active compounds according to the invention furthermore prove valuable for combating diseases of rice. Thus they display an excellent action against the fungi *Piricularia oryzae* and *Pellicularia sasakii*, as a result of which they can be employed for the conjoint combating of both diseases. This represents an important advance, since hitherto agents of differing chemical constitution were generally required for combating these two fungi. Surprisingly, the active compounds not only show a protective action, but also a curative and systemic effect.

The compounds according to the invention are however also active against other fungi which attack rice plants or other cultivated plants, such as, for example, *Cochliobolus myiabeanus, Mycosphaerella musicola, Cercospora personata, Botrytis cinerea, Alternaria species, Verticillium alboatrum, Phialophora cinerescens* and *Fusarium species*, and also against the bacterium *Xanthomonas oryzae*.

The active compounds according to the instant invention can be utilized, if desired, in the form of the usual formulations or compositions with conventional inert (i.e., plant compatible or herbicidally inert) pesticide diluents or extenders, i.e., diluents or extenders of the type usable in conventional pesticidal formulations or compositions, e.g., conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone etc.), and/or water; as well as inert dispersible finely divided solid carriers, such as ground natural minerals (e.g., kaolins, alumina, silica, chalk, i.e., calcium carbonate, talc, kieselguhr, etc.) and ground synthetic minerals (e.g. highly dispersed silicic acid, silicates, e.g., alkali silicates, etc.); whereas the following may be chiefly considered for use as conventional carrier vehicle assistants, e.g., surface-active agents, for this purpose: emulsifying agents, such as nonionic and/or anionic emulsifying agents (e.g., polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungcides, or herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 2–90 percent, by weight of the mixture, whereas carrier composition mixtures suitable for direct application or field application generally contemplate those in which the active compound is present in an amount substantially between about 0.0001–10 percent, preferably 0.01–1 percent, by weight of the mixture. Thus, the present invention contemplates over-all compositions which comprise mixtures of a conventional dispersible carrier vehicle such as (1) a dispersible carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally about 0.0001–95 percent, and preferably 0.01–95 percent, by weight of the mixture.

The active compound can also be used in accordance with the well-known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 80 or 95 percent by weight of the active compound or even the 100 percent active substance alone, e.g., about 20–100 percent by weight of the active compound.

When used as a seed dressing, amounts of active compound of about 0.1 to 10 g per kg of seed can be used, preferably about 0.2 to 2 g.

When used as a soil treatment agent, amounts of about 1 to 500 g of active substance per cubic meter of soil are generally to be used, preferably 10 to 200 g.

In particular, the present invention contemplates methods of selectively killing, combating or controlling fungi, which comprises applying to at least one of (a) such fungi and (b) their habitat, i.e., the locus to be protected, a fungicidally effective or toxic amount of the particular active compound of the invention alone or together with a carrier vehicle as noted above. The instant formulations or compositions are applied in the usual manner, for instance by squirting, spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges.

The fungicidal effectiveness of the new compounds of the present invention is illustrated, without limitation, by the following Examples.

EXAMPLE 1

Podosphera Test (Powdery Mildew of Apples)
[Protective]

Solvent:    4.7 parts by weight acetone
Emulsifier: 0.3 parts by weight alkylaryl polyglycol ether
Water:      95 parts by weight The amount of active compound required for the desired concentration of the active compound in the spray liquid is mixed with the stated amount of solvent, and the concentrate is diluted with the stated amount of water which contains the stated additions.

Young apple seedlings in the 4 – 6 leaf stage are sprayed with the spray liquid until dripping wet. The plants remain in a greenhouse for 24 hours at 20°C and at a relative atmospheric humidity of 70 percent. They are then inoculated by dusting with conidia of the apple powdery mildew causative organism (*Podosphaera leucotricha* Salm.) and placed in a greenhouse at a temperature of 21° – 23°C and at a relative atmospheric humidity of about 70 percent.

Ten days after the inoculation, the infestation of the seedlings is determined as a percentage of the untreated but also inoculated control plants.

0 percent means no infestation; 100 percent means that the infestation is exactly as great as in the case of the control plants.

The active compounds, the concentrations of the active compounds and the results obtained can be seen from the following Table 1:

| Podosphaera test/protective | | |
|---|---|---|
| | Infestation, in percent of the infestation of the untreated control, at an active compound concentration (in percent) of— | |
| Active compound | 0.0062 | 0.00156 |
| (A) $\begin{array}{c} \text{CH}_2-\text{NH}-\overset{\text{S}}{\overset{\|}{\text{C}}}-\text{S} \\ \phantom{XXXXXXXX} \diagdown \\ \phantom{XXXXXXXXXXX} \text{Zn} \\ \phantom{XXXXXXXX} \diagup \\ \text{CH}_2-\text{NH}-\underset{\text{S}}{\underset{\|}{\text{C}}}-\text{S} \end{array}$ (known). | 100 | 100 |
| (1) phenyl—N=C(SCH$_3$)—NH—COOC$_2$H$_5$, phenyl—NH—CO—CH$_3$ | 50 | ——— |
| (2) phenyl—N=C(SCH$_3$)—NH—COOC$_2$H$_5$, phenyl—NH—CO—phenyl | 1 | 23 |
| (3) phenyl—N=C(S—CH(CH$_3$)$_2$)—NH—COOC$_2$H$_5$, phenyl—NH—CO—CH$_3$ | 49 | ——— |
| (4) phenyl—N=C(S—CH$_2$—CH=CH$_2$)—NH—COOC$_2$H$_5$, phenyl—NH—CO—CH$_3$ | 65 | ——— |

EXAMPLE 2

Fusicladium Test(Systemic) (SYSTEMIC)

Solvent: 4.7 parts by weight acetone
Emulsifier: 0.3 parts by weight alkylaryl polyglycol ether
Water: 95 parts by weight The amount of the active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3–4 leaf stage, watered once in one week with 20 cc of the liquid to be used for watering, in the stated concentration of active compound, with reference to 100 cc of soil. The plants so treated are, after the treament, inoculated with an aqueous conidium suspension of *Fusicladium dendriticum* Fuckel and incubated for 18 hours in a humidity chamber at 18°–20°C and at a relative atmospheric humidity of 100 percent. The plants are subsequently placed in a greenhouse for 14 days.

15 days after inoculation, the inflection of the seedlings is determined as a percentage of the untreated but also inoculated control plants. 0 percent means no infection; 100 percent means that the infection is exactly as great as in the case of the control plants.

The active compounds, the concentrations of the active compounds and the results obtained can be seen from the following Table:

TABLE 2

Fusicladium test/systemic

| Active compound | | Infestation, in percent of the infestation of the untreated control, at an active compound concentration of 30 p.p.m. |
|---|---|---|
| (A) | $CH_2-NH-\overset{S}{\underset{\|}{C}}-S$<br>$\phantom{CH_2-NH-}\diagdown$<br>$\phantom{CH_2-NH-C-S}Zn$<br>$CH_2-NH-\underset{\|}{C}-S\diagup$<br>$\phantom{CH_2-NH-}S$<br>(known) | 100 |
| (2) | phenyl—N=C(SCH$_3$)—NH—COOC$_2$H$_5$ with —NH—CO—phenyl | 87 |
| (1) | phenyl—N=C(SCH$_3$)—NH—COOC$_2$H$_5$ with —NH—CO—CH$_3$ | 22 |
| (3) | phenyl—N=C(S—CH(CH$_3$)$_2$)—NH—COOC$_2$H$_5$ with —NH—CO—CH$_3$ | 36 |
| (4) | phenyl—N=C(S—CH$_2$—CH=CH$_2$)—NH—COOC$_2$H$_5$ with —NH—CO—CH$_3$ | 33 |

EXAMPLE 3

Fusicladium Test (Apple Scab) (Curative)

Solvent: 4.7 parts by weight acetone
Emulsifier: 0.3 parts by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the 4 – 6 leaf stage are inoculated with an aqueous conidium suspension of the apple scab causative organism (*Fusicladium dendriticum* Fuckel) and incubated for 18 hours in a humidity chamber at 18°–20°C. and at relative humidity of 100 percent. The plants are then placed in a green house where they dry.

After standing for 42 hours, the plants are sprayed dripping wet with the spray liquid prepared in the manner described above. The plants are again placed in a greenhouse.

15 days after inoculation, the infestation of the apple seedlings is determined as a percentage of the untreated but also inoculated control plants.

0 percent means no infestation; 100 percent means that the infestation is exactly as great as in the case of the control plants.

The active compounds, the concentrations of the active compounds, the period of time between inoculation and spraying and the results obtained can be seen from the following Table:

TABLE 3

Fusicladium test/curative

| Active compound | | Infestation, in percent of the infestation of the untreated control, at active compound concentration of 0.025% |
|---|---|---|
| (A) | $CH_2-NH-\overset{S}{\underset{\|}{C}}-S$<br>$\phantom{CH_2-NH-}\diagdown$<br>$\phantom{CH_2-NH-C-S}Zn$<br>$CH_2-NH-\underset{\|}{C}-S\diagup$<br>$\phantom{CH_2-NH-}S$<br>(known) | 100 |
| (1) | phenyl—N=C(SCH$_3$)—NH—COOC$_2$H$_5$ with —NH—CO—CH$_3$ | 49 |
| (2) | phenyl—N=C(SCH$_3$)—NH—COOC$_2$H$_5$ with —NH—CO—phenyl | 38 |
| (3) | phenyl—N=C(S—CH(CH$_3$)$_2$)—NH—COOC$_2$H$_5$ with —NH—CO—CH$_3$ | 51 |

TABLE 3 —Continued

Fusicladium test/curative

| Active compound | Infestation, in percent of the infestation of the untreated control, at active compound concentration of 0.025% |
|---|---|
| (1) 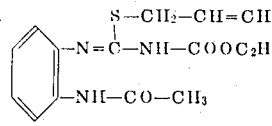 | 40 |
| (10) 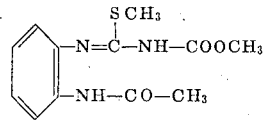 | 7 |
| (11) (structure with SCH₃, N=C—NH—COOCH₃, NH—CO—C₂H₅) | 4 |
| (13) (structure with SCH₃, N=C—NH—COOCH₃, NH—CO—C₄H₉n) | 0 |
| (14) 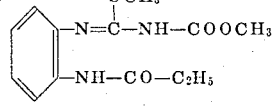 | 32 |

EXAMPLE 4

Piricularia and Pellicularia Test

| | |
|---|---|
| Solvent: | 4 parts by weight acetone |
| Dispersing agent: | 0.05 parts by weight sodium oleate |
| Water: | 95.75 parts by weight |
| Other additives: | 0.2 parts by weight gelatin |

The amount of active compound required for the desired concentration of active compound in the spray liquor is mixed with the stated amount of solvent, and the concentrate is diluted with the stated amount of water containing the stated additives.

2 batches each consisting of 30 rice plants about 2 – 4 weeks old are sprayed with the spray liquor until dripping wet. The plants remain in a greenhouse at temperatures of 22° to 24°C and a relative atmospheric humidity of about 70 percent until they are dry. One batch of the plants is then inoculated with an aqueous suspension of 100,000 to 200,000 spores/ml of *Piricularia oryzae* and placed in a chamber at 24°–26°C and 100 percent relative atmospheric humidity. The other batch of the plants is infected with a culture of *Pellicularia sasakii* grown on malt agar and placed at 28° 14 30°C and 100 percent relative atmospheric humidity.

5 to 8 days after inoculation, the infection of all the leaves present at the time of inoculation with *Piricularia oryzae* is determined as a percentage of the untreated but also inoculated control plants. In the case of the plants infected with *Pellicularia sasakii*, the infection on the leaf sheaths after the same time is also determined in proportion to the untreated but infected control. 0 percent means no infection; 100 percent means that the infection is exactly as great in the case of the control plants.

The active compounds, the concentrations of the active compounds and the results obtained can be seen from the following Table:

TABLE 4

Piricularia (a) and Pellicularia (b) test, protective

| | Infestation, in percent of the infestation of the untreated control, at active compound concentration, in percent of— | | | |
|---|---|---|---|---|
| | a | | b | |
| Active compound | 0.05 | 0.025 | 0.05 | 0.025 |
| (A) CH₂—NH—CS—S \ Zn / CH₂—NH—CS—S (known). | 25 | 100 | 25 | 50 |
| (1) 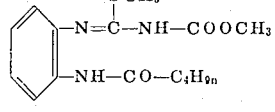 | 25 | | | |
| (2) (structure with SCH₃, N=C—NH—COOC₂H₅, NH—CO—phenyl) | 0 | 0 | 0 | 0 |
| (3) (structure with S—CH(CH₃)₂, N=C—NH—COOC₂H₅, NH—CO—CH₃) | 0 | 0 | 0 | 0 |
| (4) 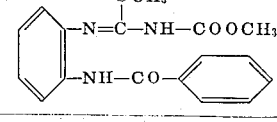 | 0 | 50 | 50 | |

EXAMPLE 5

Piricularia Test/Liquid Active Compound Preparation

| | |
|---|---|
| Solvent: | 1.9 parts by weight DMF |
| Dispersing agent: | 0.1 part by weight alkylaryl polyglycol ether |
| Water: | 98 parts by weight |

The amount of active compound required for the desired concentration of active compound in the spray liquid is mixed with the stated amount of solvent and dispersing agent and the concentrate is diluted with the stated amount of water.

30 rice plants about 14 days old are sprayed with the spray liquid until dripping wet. The plants remain in a greenhouse at temperatures of 22° to 24°C and a relative atmospheric humidity of about 70 percent until they are dry. Then they are inoculated with an aqueous suspension of 100,000 to 200,000 spores/ml of *Piricularia oryzae* and placed in a chamber at 100 percent relative atmospheric humidity.

5 days after inoculation the infestation of all the leaves present at the time of inoculation is determined as a percentage of the untreated but also inoculated control plants. 0 percent means no infestation; 100 percent means that the infestation is exactly as great as in the case of the control plants.

The active compounds, the concentrations of the active compounds and the results obtained can be seen from the following Table 5.

Additional Test/Curative Fungicidal Action

In order to ascertain the curvative fungicidal action, the above test is repeated, except that the given active compound is applied not before, but only 16 hours after, inoculation.

The particular active compounds tested, their concentrations, and the results obtained can be seen from the following Table

TABLE 5
Piricularia test/liquid active compound preparation

| Active compound | | Infestation, in percent of the infestation of the untreated control, at active compound concentration of 0.025% |
|---|---|---|
| (10) ![structure: phenyl-N=C(SCH3)-NH-COOCH3, NH-CO-CH3] | Pr. Cur. | 0 25 |
| (11) ![structure: phenyl-N=C(SCH3)-NH-COOCH3, NH-CO-C2H5] | Pr. Cur. | 0 13 |
| (12) ![structure: phenyl-N=C(SCH3)-NH-CO-O-CH3, NH-CO-C3H7] | Pr. Cur. | 0 0 |
| (13) ![structure: phenyl-N=C(SCH3)-NH-COOCH3, NH-CO-C4H9n] | Pr. Cur. | 0 13 |
| (14) ![structure: phenyl-N=C(SCH3)-NH-COOCH3, NH-CO-phenyl] | Pr. | 0 |
| (16) ![structure: phenyl-N=C(SCH3)-NH-CO-O-CH3, NH-CO-CH(CH3)2] | Pr. Cur. | 0 25 |

TABLE 5—Continued
Piricularia test/liquid active compound preparation

| Active compound | | Infestation, in percent of the infestation of the untreated control, at active compound concentration of 0.025% |
|---|---|---|
| (17) ![structure: phenyl-N=C(SCH3)-NH-CO-O-CH3, NH-CO-CH2-CH(CH3)2] | Pr. | 0 |

EXAMPLE 6
Agar Plate Test

Test for fungitoxic effectiveness and breadth of the activity spectrum.

| Solvent: | Acetone | |
|---|---|---|
| Parts by weight: | a) 1000 | b) 100 |

To produce a suitable preparation of the active compound, 1 part by weight of the active compound is taken up in the stated amount of solvent.

To potato dextrose agar which has been liquefied by heating there is added the preparation of the active compound in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm diameter. The Petri dishes remain at 20°C for 3 days for incubation.

After this time, the inhibiting action of the active compound on the mycelium growth is determined in categories, taking into account the untreated control. 0 means no mycelium growth, either on the treated substrate or on the inoculum; the symbol − means mycelium growth on the inoculum only, no spread to the treated substrate; and the symbol + means mycelium growth from the inoculum on to the treated substrate, similar to the spread to the untreated substrate of the control.

The active compounds, the concentration of the active compounds, the test fungi and the inhibition effects achieved can be seen from the following Table:

TABLE 6
Agar plate test

| Active compound | | Active compound concentration in the substrate, in p.p.m. | Corticium rolfsii | Sclerotinia sclerotiorum | Verticillium albo-atrum | Thielaviopsis basicola | Pdytophthora cactorum | Fusarium culmorum | Fusarium oxysporum | Fusarium solani f. pisi |
|---|---|---|---|---|---|---|---|---|---|---|
| | Untreated | | + | + | + | + | + | + | + | + |
| (A) | CH2—NH—CS—S\\Zn / CH2—NH—CS—S (known). | (a) 10 (b) 100 | + + | + + | + + | + 0 | ---------- ---------- | + + | + + | + + |

TABLE 6 — Continued

Agar plate test

| Active compound | | Active compound concentration in the substrate, in p.p.m. | Corticium rolfsii | Sclerotinia sclerotiorum | Verticillium alboatrum | Thielaviopsis basicola | Phytophthora cactorum | Fusarium culmorum | Fusarium oxysporum | Fusarium solani f. pisi |
|---|---|---|---|---|---|---|---|---|---|---|
| (1) | Phenyl-N=C(SCH₃)—NH—COOC₂H₅, phenyl-NH—CO—CH₃ | (a) 10<br>(b) 100 | +<br>+ | —<br>0 | +<br>+ | —<br>0 | +<br>+ | +<br>0 | +<br>0 | +<br>+ |
| (2) | Phenyl-N=C(SCH₃)—NH—COOC₂H₅, phenyl-NH—CO-phenyl | (a) 10<br>(b) 100 | +<br>+ | 0<br>0 | +<br>— | 0<br>0 | +<br>+ | —<br>0 | 0<br>0 | +<br>+ |
| (3) | S—CH(CH₃)₂, phenyl-N=C—NH—COOC₂H₅, phenyl-NH—CO—CH₃ | (a) 10<br>(b) 100 | +<br>+ | 0<br>0 | +<br>— | —<br>0 | +<br>+ | 0<br>0 | 0<br>0 | +<br>+ |
| (4) | S—CH₂—CH=CH₂, phenyl-N=C—NH—COOC₂H₅, phenyl-NH—CO—CH₃ | (a) 10<br>(b) 100 | +<br>+ | 0<br>0 | +<br>0 | —<br>0 | +<br>+ | +<br>0 | 0<br>0 | +<br>+ |

EXAMPLE 7

Seed dressing Test/Bunt of Wheat
(Seed-Borne-Mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g of the chlamydospores of *Tilletia caries* per kg of seed. To apply the dressing, the seed is shaken with the dressing in a closed glass flask. The seed, on moist loam under a cover of a layer of muslin and 2 cm of moderately moist compost soil, is exposed to optimum germination conditions for the spores for 10 days at 10°C in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table:

TABLE 7

Seed dressing test/bunt of wheat

| Active compound | Active compound concentration in the dressing in percent by weight | Amount of dressing used in g./kg. of seed | Spore germination, in percent |
|---|---|---|---|
| Without dressing | | | >10 |
| (A) CH₂—NH—CS—S\Zn, CH₂—NH—CS—S (known). | 10 | 1 | 5 |
| (2) phenyl-N=C(SCH₃)—NH—COOC₂H₅, phenyl-NH—CO-phenyl | 10<br>30 | 1<br>1 | 0.005<br>0.000 |
| (3) S—CH(CH₃)₂, phenyl-N=C—NH—COOC₂H₅, phenyl-NH—CO—CH₃ | 10<br>30 | 1<br>1 | 0.005<br>0.000 |

EXAMPLE 8

Erysiphe Test

Solvent: 4.7 parts by weight acetone
Emulsifier: 0.3 parts by weight alkylaryl polyglycol ether
Water: 95.0 parts by weight The amount of the active compound required for the desired concentration of active compound in the spray liquid is mixed with the stated amount of the solvent, and the concentrate is diluted with the stated amount of water containing the stated additions.

Young cucumber plants with about three foliage leaves are sprayed with the spray liquid until dripping wet. The cucumber plants remain in a greenhouse for 24 hours to dry. They are then, for the purpose of inoculation, dusted with conidia of the fungus *Erysiphe cichoracearum*. The plants are subsequently placed in a greenhouse at 23°–24°C and at a relative atmospheric humidity of about 75 percent.

After 12 days, the infestation of the cucumber plants is determined as a percentage of the untreated but also inoculated control plants. 0 percent means no infestation; 100 percent that the infestation is exactly as great as in the case of the control plants.

The active compounds, the concentrations of the active compounds and the results obtained can be seen from the following Table 8:

TABLE 8

Erysiphe test

| Active compound | Infestation, in percent of the infestation of the untreated control, at active compound concentration of 0.0062% |
|---|---|
| (A) $CH_2-NH-CS-S$ \ Zn / $CH_2-NH-CS-S$ (known) | 100 |
| (10) phenyl-$N=C(SCH_3)-NH-COOCH_3$, $-NH-CO-CH_3$ | 0 |
| (11) phenyl-$N=C(SCH_3)-NH-COOCH_3$, $-NH-CO-C_2H_5$ | 0 |
| (12) phenyl-$N=C(SCH_3)-NH-CO-O-CH_3$, $-NH-CO-C_3H_7$ | 12 |
| (13) phenyl-$N=C(SCH_3)-NH-COOCH_3$, $-NH-CO-C_4H_{9n}$ | 12 |
| (1) phenyl-$N=C(SCH_3)-NH-COOC_2H_5$, $-NH-CO-CH_3$ | 47 |

EXAMPLE 9

Erysiphe Test/Systemic

Solvent: 4.7 parts by weight acetone
Emulsifier: 0.3 parts by weight alkylaryl polyglycol ether
Water: 95 parts by weight The amount of the active compound required for the desired concentration in the watering liquid is mixed with the stated amount of the solvent, and the concentrate is diluted with the stated amount of water containing the stated additions.

Cucumber plants grown in standard soil, in the one- to two-leaf stage, are watered once in one week with 20 cc of the watering liquid having the stated concentration of active compound with reference to 100 cc of soil.

The plants so treated are, after the treatment, inoculated with conidia of the fungus *Erysiphe cichoracearum*. The plants are subsequently placed in a greenhouse at 23°–24°C and a relative atmospheric humidity of 70 percent.

After 12 days, the infestation of the cucumber plants is determined as a percentage of the untreated but also inoculated control plants. 0 percent means no infestation; 100 percent means that the infestation is exactly as great as in the case of the control plants.

The active compounds, the concentrations of the active compounds and the results obtained can be seen from the following Table 9.

TABLE 9

Erysiphe test/systemic

| Active compound | Infestation in percent of the infestation of the untreated control, at active compound concentration of 100 p.p.m. |
|---|---|
| (A) $CH_2-NH-CS-S$ \ Zn / $CH_2-NH-CS-S$ | 100 |
| (10) phenyl-$N=C(SCH_3)-NH-COOCH_3$, $-NH-CO-CH_3$ | 0 |
| (11) phenyl-$N=C(SCH_3)-NH-COOCH_3$, $-NH-CO-C_2H_5$ | 0 |
| (12) phenyl-$N=C(SCH_3)-NH-CO-O-CH_3$, $-NH-CO-C_3H_7$ | 0 |
| (13) phenyl-$N=C(SCH_3)-NH-COOCH_3$, $-NH-CO-C_4H_{9n}$ | 0 |
| (17) phenyl-$N=C(SCH_3)-NH-CO-O-CH_3$, $NH-CO-CH_2-CH(CH_3)_2$ | 34 |

TABLE 9 — Continued
Erysiphe test/systemic

| Active compound | Infestation in percent of the infestation of the untreated control, at active compound concentration of 100 p.p.m. |
|---|---|
| (1) 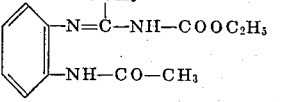 | 0 |

The following examples illustrate the process for the preparation of the active compounds according to the present invention.

EXAMPLE 10

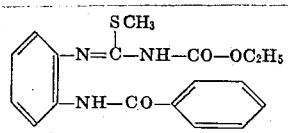 (2)

34.4 g (0.1 mole) of N-2-benzamidophenyl-N'-ethoxycarbonylthiourea and 5.6 g (0.1 mole) of potassium hydroxide are dissolved in a mixture of 50 cc of water and 50 cc of dimethylformamide. 14.2 g (0.1 mole) of methyl iodide are added thereto, and the mixture is left to stand for 3 hours and is then poured into 1 liter of water. The product which hereupon precipitates is filtered off, washed with water and dried. 32 g of N-(2-benzamidophenyl)-N'-ethoxycarbonyl-S-methylisothiourea, which can be purified by recrystallization from alcohol, are obtained. The compound melts at 149°C, with decomposition. The yield is 85 percent of theory.

EXAMPLE 11

The following compounds may be prepared by methods analogous to that described in Example 7.

| | Formula | Melting point |
|---|---|---|
| (1) | 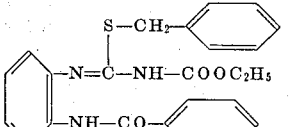 | 165° C. (decomposition). |
| (3) | 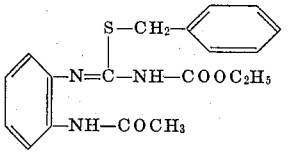 | 163° C. (decomposition). |
| (4) | 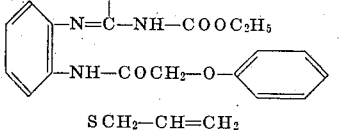 | 164° C. |
| (5) | 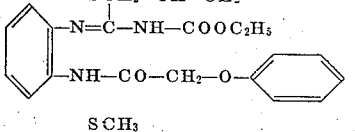 | 89–90° C. |
| (6) | 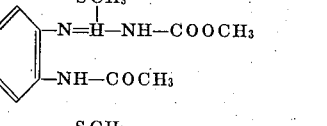 | 150–151° C. |
| (7) | 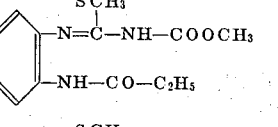 | >200° C. |
| (8) | 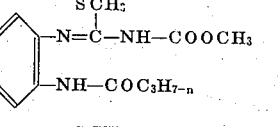 | 126–129° C. |
| (9) | 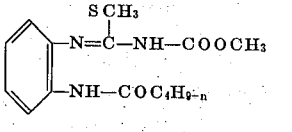 | 133–135° C. |
| (10) | 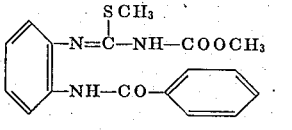 | 154–158° C. (decomposition). |
| (11) | 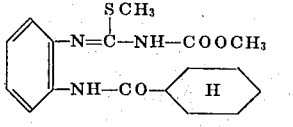 | 130° C. |
| (12) | 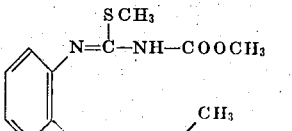 | 115–116° C. |
| (13) | 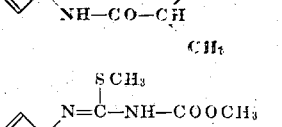 | 111–114° C. |
| (14) | 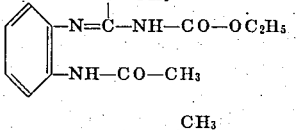 | 157–159° C. |
| (15) | 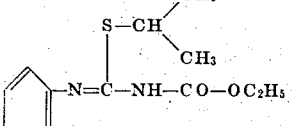 | 151–152° C. |
| (16) | 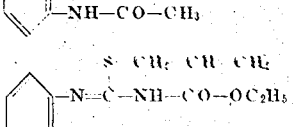 | 143–144° C. |
| (17) | 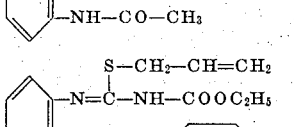 | 139–140° C. |

It will be appreciated that the instant specification and examples are set forth by way of illustration and not limitation, and that various modifications and changes may be made without departing from the spirit and scope of the present invention.

What is claimed is:

1. A fungicidal composition comprising a fungicidally effective amount of an amidophenylisothiourea of the formula

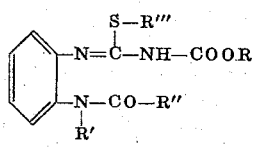

in which
R is lower alkyl,
R' is hydrogen,
R'' is phenyl, phenoxymethyl, cyclohexyl, methyl, ethyl, propyl, isopropyl, butyl or isobutyl, and
R''' is alkyl of up to 4 carbon atoms,
in admixture with a diluent.

2. The composition according to claim 1 wherein said amidophenylisothiourea is:
N-(2-acetamidophenyl)-N'-methoxycarbonyl-S-methylisothiourea,
N-(2-propionamidophenyl)-N'-methoxycarbonyl-S-methylisothiourea,
N-(2-valeramidophenyl)-N'-methoxycarbonyl-S-methylisothiourea,
N-(2-benzoylamidophenyl)-N'-methoxycarbonyl-S-methylisothiourea,
N-(2-isovaleramidophenyl)-N'-methoxycarbonyl-S-methylisothiourea, or
N-(2-isobutyramidophenyl)-N'-methoxycarbonyl-S-methylisothiourea.

3. A method of combating fungi which comprises applying to a fungus or fungus habitat a fungicidally effective amount of an amidophenylisothiourea of the formula

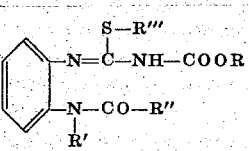

in which
R is lower alkyl,
R' is hydrogen,
R'' is phenyl, phenoxymethyl, cyclohexyl, methyl, ethyl, propyl, isopropyl, butyl or isobutyl, and
R''' is alkyl of up to 4 carbon atoms.

4. The method according to claim 3 wherein said compound is N-(2-acetamidophenyl)-N'-methoxycarbonyl-S-methylisothiourea of the formula

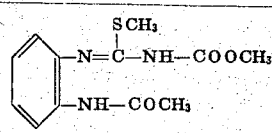

(10)

5. The method according to claim 3 wherein said compound is N-(2-propionamidophenyl)-N'-methoxycarbonyl-S-methylisothiourea of the formula

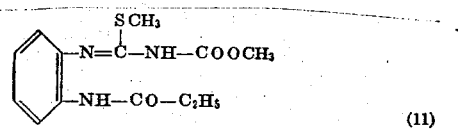

(11)

6. The method according to claim 3 wherein said compound is N-(2-valeramidophenyl)-N'-methoxycarbonyl-S-methylisothiourea of the formula

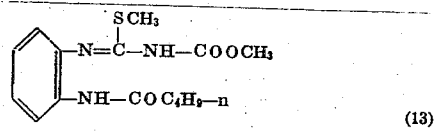

(13)

7. The method according to claim 3 wherein said compound is N-(2-benzoylamidophenyl)-N'-methoxycarbonyl-S-methylisothiourea of the formula

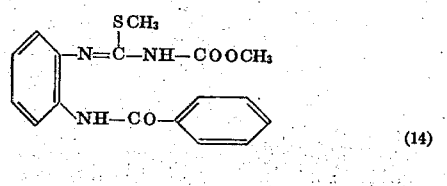

(14)

8. The method according to claim 3 wherein said compound is N-(2-isovaleramidophenyl)-N'-methoxycarbonyl-S-methylisothiourea of the formula

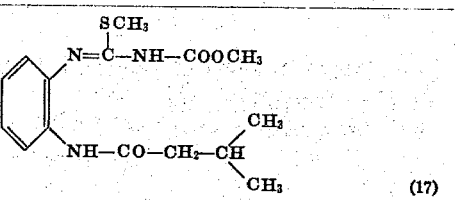

(17)

9. The method according to claim 3 wherein said compound is N-(2-isobutyramidophenyl)-N'-methoxycarbonyl-S-methylisothiourea of the formula

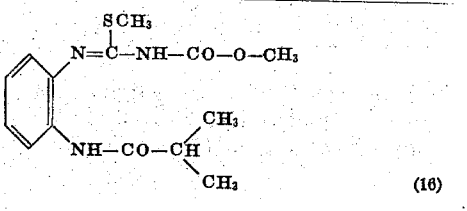

(16)

* * * * *